Sept. 3, 1929. H. L. RANK ET AL 1,727,036
TUBULAR PROCESSING APPARATUS
Filed Jan. 23, 1926 2 Sheets-Sheet 1
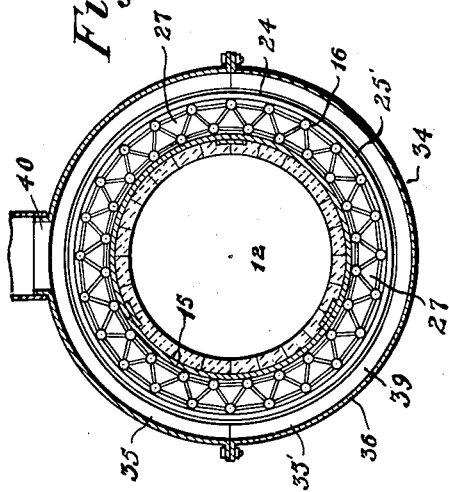
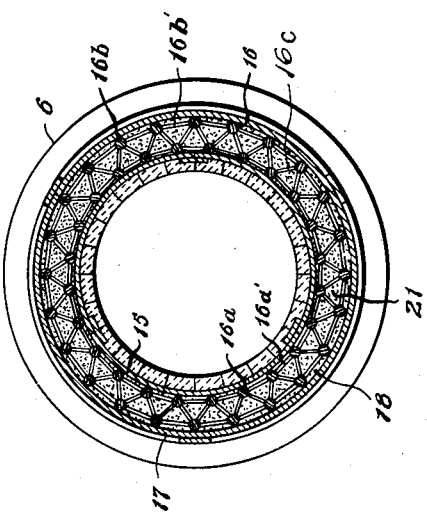
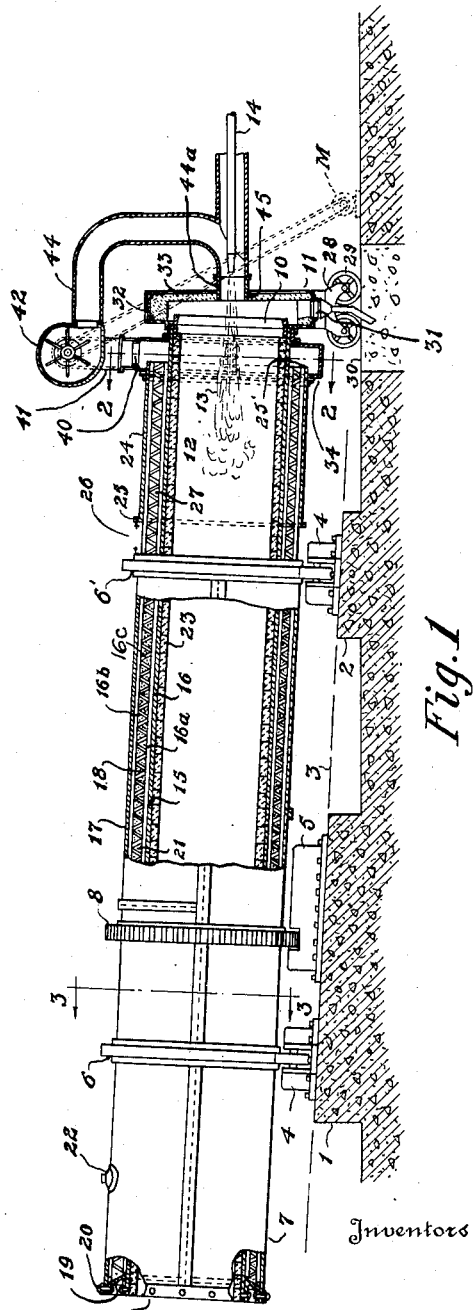
Inventors
Homer L. Rank
Hurxthal F. Frease

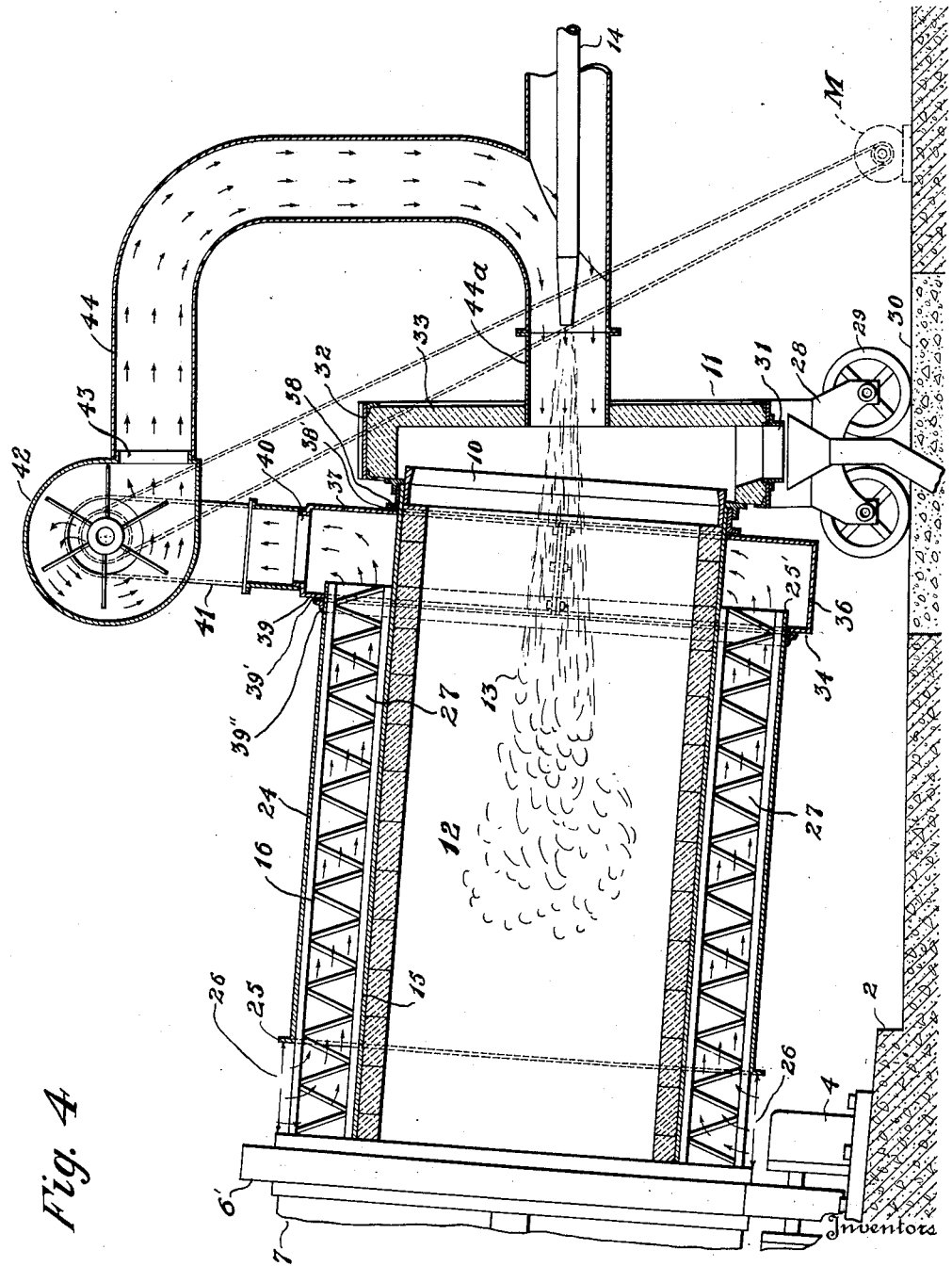

Patented Sept. 3, 1929.

1,727,036

UNITED STATES PATENT OFFICE.

HOMER L. RANK AND HURXTHAL F. FREASE, OF CANTON, OHIO.

TUBULAR-PROCESSING APPARATUS.

Application filed January 23, 1926. Serial No. 83,365.

The invention relates to apparatus such as rotary kilns and the like for use in chemical, mineral and metallurgical, material handling and treating processes, and more particularly in the manufacture of cement, and this application relates to the subject matter of our United States Letters Patent No. 1,579,030, dated March 30, 1926, for Tubular processing apparatus.

The present improvements pertain particularly to processes such as the manufacture of cement wherein portions of a rotary kiln enclosing a chamber known as the hot or burning zone are subject to direct and usually radiant heat as from the combustion of pulverized fuel, gas or the like, inside the aforesaid burning zone.

Ordinary single shell rotary tubular kilns not constructed with the tubular sustaining truss structures disclosed in our pending application aforementioned, are usually provided with refractory linings which are sometimes subject to the building up of rings of fusing cement in the hot zone which do no properly break down and move along the kiln and discharge therefrom. This and other conditions frequently causes overheating of the hot zone of the kiln to the extent that the refractory lining burns out and exposes the steel shell of the cylindrical kiln to the intense heat of the burning zone, and the steel shell thus exposed is frequently so damaged as to require the stopping of the apparatus and the replacement of the burnt out steel shell and refractories.

The objects of the present improvements are to prevent overheating of the refractory lining and tubular kiln shell at the hot zone, and at the same time and by cooperating means, provide a convenient and economical supply of preheated air for supporting the combustion of pulverized fuel, or the like, in the burning zone.

The attainment of these objects is advantageous, not only in cement kilns, but also for continuous tubular metallurgical furnaces where it is very desirable not to chill the ores or metals being treated therein by the introduction of unpreheated secondary air for combustion.

These objects are attained in the present improvements by ventilating the kiln of the hot zone by the use of an outer tubular shell surrounding the inner tubular kiln shell at the hot zone, and preferably spaced from the inner shell by a tubular trussed structure, the two spaced shells thus forming an annular chamber around and beyond the entire kiln hot zone, and ventilating means including a centrifugal exhaust fan connected with the annular chamber and drawing media such as air therethrough for preventing overheating of the inner shell and its refractory lining, and for delivering the media drawn through the annular chamber into the burning zone for providing a preheated combustion media for the fuel.

A preferred embodiment of the improvement is illustrated in the accompanying drawings forming part hereof, in which—

Figure 1 is a side elevation with portions in longitudinal cross section of the improved apparatus set up as for the manufacture of cement;

Fig. 2, a transverse cross section of the same at the burning zone with distant parts removed as on line 2—2, Fig. 1;

Fig. 3, a transverse cross section of the same near the material receiving end of the kiln with distant parts removed as on line 3—3, Fig. 1; and Fig. 4, an enlarged view of the hot zone end of the apparatus of Fig. 1.

Throughout the drawings, where means such as rivets are not specifically illustrated for securing apparatus parts together, it is to be understood that the parts are secured to each other when necessary and desirable by some form of welds, such as arc welds not readily adapted to convenient illustration; although rivets, bolts, or other fastening means, not shown, may be substituted for the welds when desired.

Likewise, the truss formations, which constitute parts of the apparatus may be made according to any well known manner; but it is preferred to use some form of truss structures which are described in the United States patent to George Hives Dawson and Hurxthal Field Frease, No. 1,526,463, dated February 17, 1925, and in subsequent joint and several applications for Letters Patent of the aforesaid.

Similar numerals refer to similar parts throughout the drawings.

The improved tubular processing apparatus includes supporting foundations 1 and 2 which may be made of concrete or the like and have top levels in the same plane 3 inclined to the horizontal, the foundations maintaining a plurality of carrying and thrust mechanisms indicated at 4 of any usual design and an enclosed driving mechanism indicated at 5 likewise of any usual design.

The carrying and thrust mechanisms 4 support in a usual manner rotatable riding rings 6 and 6' suitably spaced upon and secured to a rotary tubular kiln 7, and the driving mechanism 5 is in usual operative connection with a rotatable gear ring 8 secured to the kiln as illustrated.

In accordance with usual practice by the above arrangement, the material inlet 9 of the kiln is at a higher lever than its outlet 10, and a movable furnace housing 11 is provided for communication from the outlet of the kiln to other apparatus in a cement manufacturing plant, such as the inlet of a cooler.

In accordance with usual practice, the ingredients of cement may be directed into the kiln through the inlet by any convenient means, where they are caused to proceed at a desired speed through the kiln by the inclination of the same and by rotation of the same by the driving mechanism 5.

During their progress through the kiln, the ingredients are subjected to progressively intensified heat action as from a direct flame caused by the combustion in the burning zone of the kiln, indicated at 12, and extending inwardly from the kiln outlet, of fuel such as pulverized coal or the like, indicated at 13, injected therein as from a fuel supply line 14.

The burning or hot zone of the kiln may extend from the kiln outlet toward the riding ring 6'.

The kiln 7 includes an inner tubular shell 15 made in a usual manner from a plurality of formed plates joined to each other at their edges.

A tubular frame structure, preferably a circumferentially and longitudinally trussed tubular structure, indicated at 16, and including members 16$^a$ and 16$^{a'}$, determining an inner tubular surface, members 16$^b$ and 16$^{b'}$ determining an outer tubular surface, and members 16$^c$ connecting the inner and outer surface members, may be provided about the greater portion of the entire length of the inner shell 15, as illustrated, for reinforcing and maintaining the same.

An outer tubular shell 17 may be spaced and maintained about the tubular frame structure and the inner tubular shell 15, from the inlet end of the kiln as far as the riding ring 6', forming an annular chamber 18 between the two shells.

The inlet end of this chamber may be closed by an expansion ring 19 secured to the ends of the shells as by rivets 20 and the riding ring 6' may close the other end of the chamber 18, all the joints of the chamber being preferably caulked to make the chamber substantially air-tight.

The chamber 18 may be filled with a heat insulating material 21 such as diatomaceous earth, and a suction valve 22 may be provided in the outer shell for connection with a suction pump for the purpose of substantially evacuating the voids in the chamber 18 when the apparatus is first constructed; and for subsequent connections with a suction pump from time to time as may be required to maintain the desired vacuum.

A refractory lining 23 is provided in the usual manner for protecting the inner surface of the inner shell from the direct action of heat.

That portion of the length of the tubular frame structure extending over the entire hot zone beyond the riding ring 6' toward the outlet end of the kiln, maintains an outer tubular shell 24 terminating at its end nearest the riding ring 6' with an outturned flange 25 spaced a substantial longitudinal distance indicated at 26, from the riding ring, and terminating at its end nearest the kiln outlet with a peripheral edge 25', thus forming an open ended annular chamber 27 about and beyond the entire hot zone of the kiln.

The tubular frame structure supporting the outer tubular shell 24, being in direct contact with the inner shell 15, also provides heat conducting radiating members in the annular chamber 27, thereby very greatly increasing the radiation area therein subject to the cooling action of air flowing therethrough.

The air inlet for the chamber 27, formed as aforesaid by terminating the shell 24 as by an outturned flange 25 spaced a substantial longitudinal distance from the riding ring 6', is thus spaced intermediate the ends of the inner shell so that air flowing through the chamber 27 will pass over the entire hot zone of the kiln.

The furnace housing 11 is preferably mounted upon a truck 28 carried upon wheels 29 riding upon the floor level at 30. The truck 28 also supports a downwardly extending, spout or chute indicated generally at 31 for the outlet of the kiln.

The removable furnace housing 11 includes a tubular section 32 provided with a closed outer end 33, and the tubular section is in substantial axial continuation with the tubular kiln.

An annular collecting ring 34 surrounds the outlet end of the kiln near the furnace housing, and this collecting ring preferably includes separable sections 35 and 35' forming a tubular wall 36 of substantially greater diameter than the shell 24 and provided with an inturned peripheral end flange 37 for making a gas seal with a seal ring 38' and an angle ring 38, the angle ring being secured to the inner kiln shell 15 near the outlet end of the kiln, and the tubular wall 36 being also provided with an inturned peripheral flange 39 for making a gas seal with a seal ring 39' and an angle 39", the angle being secured near the peripheral edge 25' of the shell 24, the collecting ring 34 thus made closing the kiln outlet end of the chamber 27.

The annular collecting ring 34 is provided with an upwardly extending outlet 40 removably connected with the inlet pipe 41 of a centrifugal exhaust fan 42 having an outlet 43 removably connected to an elbow pipe 44 communicating with the kiln interior through a central aperture 45 in the end wall 33.

The fuel supply line 14 is preferably directed into the horizontal end terminal 44$^a$ of the elbow 44 communicating into the kiln interior as aforesaid.

In operation the cement material is admitted into the kiln as aforesaid, and fuel, such as powdered coal, is injected through the outlet end of the kiln into the burning zone 12, where combustion occurs and intense heat is generated.

The centrifugal exhaust fan 42 may then be operated as by means of a suitably connected motor M, to draw air through the annular chamber 27 about the entire kiln hot zone, thereby ventilating all of the refractory lining and kiln shell at the hot zone and preventing overheating of the lining and shell.

The temperature of the air thus drawn through the annular chamber 27 is raised to a temperature which may be several hundred degrees above the temperature of the atmosphere surrounding the whole apparatus, and the centrifugal exhaust fan, having its outlet converging with the fuel stream and entering into the kiln as aforesaid, thus provides a convenient and economical supply of preheated air to support rapid and complete combustion of the pulverized fuel injected into the burning zone.

We claim:—

1. A tubular processing apparatus including a shell, a hot zone within the shell, radiating members for the shell, and means ventilating the shell and radiating members around the hot zone.

2. A tubular processing apparatus including a shell, a hot zone within the shell, radiating members for the shell, and means ventilating the exterior of the shell and radiating members around the hot zone.

3. A tubular processing apparatus including a shell, a duct surrounding the shell, radiating members for the shell within the duct, a collector ring communicating with the duct, and means for flowing heat transfer media through the duct and into the collector ring.

4. A tubular processing apparatus including a shell, a combustion zone within the shell, a duct surrounding the shell around the combustion zone, an inlet for the duct intermediate the ends of the shell, means for flowing combustion supporting media through the duct and into the combustion zone, and means on the outside of the shell for restricting heat flow from portions of the shell beyond the combustion zone.

5. A tubular processing apparatus including a shell, a duct surrounding the shell, an inlet for the duct intermediate the ends of the shell, means for flowing heat transfer media through the duct, and a pipe communicating with the interior of the shell and with the duct.

6. A tubular processing apparatus including an inner shell, an outer shell, and an annular chamber between the shells, a pipe communicating with the interior of the inner shell, and means for flowing heat transfer media through the chamber to the pipe and into the interior of the inner shell.

7. A tubular processing apparatus including a shell, a hot zone within the shell, a pipe communicating with the hot zone, a fuel supply line within the pipe, and means for flowing heat transfer media about the shell around the hot zone and into the pipe.

8. A tubular processing apparatus including a shell, a combustion zone within the shell, a pipe for supplying combustion supporting media into the combustion zone, and means for flowing combustion supporting media about the shell around the combustion zone and into the pipe.

In testimony that we claim the above, we have hereunto subscribed our names.

HOMER L. RANK.
HURXTHAL F. FREASE.